United States Patent
Lee et al.

(10) Patent No.: US 9,091,802 B2
(45) Date of Patent: Jul. 28, 2015

(54) FLEXIBLE PRINTED CIRCUIT BOARD AND SMALL CAMERA APPARATUS INCLUDING THE SAME

(71) Applicant: SAMSUNG ELECTRONICS CO., LTD., Suwon-si, Gyeonggi-do (KR)

(72) Inventors: Kyung-bae Lee, Busan (KR); Seung-hwan Lee, Suwon-si (KR); Jong-hyeok Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 14/024,834

(22) Filed: Sep. 12, 2013

(65) Prior Publication Data

US 2014/0184891 A1 Jul. 3, 2014

(30) Foreign Application Priority Data

Dec. 28, 2012 (KR) .......................... 10-2012-0157331

(51) Int. Cl.
*H04N 5/225* (2006.01)
*G02B 7/04* (2006.01)
*H04N 5/232* (2006.01)
*G03B 3/02* (2006.01)

(52) U.S. Cl.
CPC .. *G02B 7/04* (2013.01); *G03B 3/02* (2013.01); *H04N 5/2251* (2013.01); *H04N 5/2253* (2013.01); *H04N 5/23212* (2013.01)

(58) Field of Classification Search
CPC ................................ H04N 5/2351; G03B 3/02
USPC ........................................................ 348/375
See application file for complete search history.

(56) References Cited

U.S. PATENT DOCUMENTS

2005/0185532 A1* 8/2005 Kang et al. ................. 369/44.22

FOREIGN PATENT DOCUMENTS

| JP | 2003-131105 A | 5/2003 |
|---|---|---|
| JP | 2004-163748 A | 6/2004 |
| JP | 2006-184544 A | 7/2006 |
| JP | 2006184544 A * | 7/2006 |

OTHER PUBLICATIONS

Extended European Search Report issued for EP 13186983.6 (May 22, 2014).

* cited by examiner

*Primary Examiner* — Usman Khan
(74) *Attorney, Agent, or Firm* — Drinker Biddle & Reath LLP (57) ABSTRACT

A small camera apparatus includes a base, a lens barrel, a lens driving assembly, and a first flexible printed circuit board. The lens barrel is disposed to be spaced apart from the image sensor in an optical axis direction and has at least one lens. The lens driving assembly has a supporting frame, a first moving frame supported on the supporting frame to be movable in the optical axis direction, and a second moving frame loaded with the lens barrel and supported on the first moving frame to be movable in directions perpendicular to the optical axis direction. The first flexible printed circuit board (FPCB) provides an electrical signal, for driving the second moving frame, to the first moving frame. At least a portion of the first FPCB is bent and is disposed between the base and the first moving frame. At least a portion of the bent portion is bonded to reduce a bending tension that occurs in a direction opposite to a bending direction when the first FPCB is bent.

29 Claims, 7 Drawing Sheets

FLEXIBLE PRINTED CIRCUIT BOARD AND SMALL CAMERA APPARATUS INCLUDING THE SAME

CROSS-REFERENCE TO RELATED PATENT APPLICATION

This application claims the priority benefit under 35 U.S.C. §119(a) from Korean Patent Application No. 10-2012-0157331, filed on 28 Dec. 2012, in the Korean Intellectual Property Office, the disclosure of which is incorporated herein in its entirety by reference.

BACKGROUND

1. Field

The disclosure herein relates to a flexible printed circuit board and a small camera apparatus including the same, and more particular, to a flexible printed circuit board, which is used in a small camera apparatus having an autofocus and optical image stabilization function, and a small camera apparatus including the flexible printed circuit board.

2. Description of the Related Art

As demands for mobile devices such as a mobile phone, a notebook, a tablet PC, and the like increase recently, demands for small camera apparatuses that are used in the mobile devices also are increasing. In addition, the small camera apparatuses that are used in the mobile devices require high pixel density and high functionality, such as a zoom function and an autofocus function of automatically setting a focus.

In general, a small camera apparatus that is adopted in a mobile device may include an optical system including a lens, a lens driving unit for moving the optical system in an optical axis direction to adjust a focus, and an image sensor for imaging light received through the optical system to change the light into an image signal. However, in the small camera apparatus formed in this manner, according to the implementation of high pixel density and high functionality, the sizes of pixels become smaller and the number of components through which light passes is increased, and thus, the sensitivity to light that is imaged by the image sensor is increased. Thus, when operating a shutter of the small camera apparatus, a focus of an image that is captured by the image sensor may be reduced even by a small vibration, and thus, image quality may be degraded.

To prevent image degradation due to such a vibration, optical image stabilization may be achieved by providing relative displacement for a lens in a direction perpendicular to the optical axis.

In a method of obtaining optical image stabilization by providing relative displacement for a lens, a biaxial guide is mounted and the lens is driven in a direction perpendicular to an optical axis along the biaxial guide. The optical image stabilization may be achieved in a direction relative to a driving displacement that occurs due to a vibration.

In this case, a flexible printed circuit board (FPCB) may be used to supply an electrical signal for providing the relative displacement for the lens in the direction perpendicular to the optical axis. By using the FPCB, the electrical signal may be provided despite the movement of the lens. However, since the size of the small camera apparatus is small, a bending tension that occurs in a direction opposite to a bending direction when the FPCB is bent may disturb the movement of the lens.

SUMMARY

Embodiments of the invention provide a flexible printed circuit board (FPCB) for reducing a bending tension.

Embodiments of the invention also provide a small camera apparatus having an autofocus and image stabilization function, in which a lens may be accurately moved.

An embodiment includes a small camera apparatus that includes a base, a lens barrel, a lens driving assembly, and a first flexible printed circuit board. The base includes an image sensor. The lens barrel is disposed to be spaced apart from the image sensor in an optical axis direction. The lens barrel includes at least one lens. The lens driving assembly includes a supporting frame, a first moving frame supported on the supporting frame to be movable in the optical axis direction, and a second moving frame loaded with the lens barrel and supported on the first moving frame to be movable in a direction perpendicular to the optical axis direction. The first flexible printed circuit board (FPCB) provides an electrical signal, for driving the second moving frame, to the first moving frame. At least a portion of the first FPCB is bent and is disposed between the base and the first moving frame. At least a portion of the bent portion is bonded to reduce a bending tension that occurs in a direction opposite to a bending direction when the first FPCB is bent.

The first FPCB may include a fixing portion that is fixedly connected to the first moving frame, a bending portion that extends from the fixing portion and of which at least a portion is bent and is disposed between the base and the first moving frame, and a bonding portion that bonds portions of the bending portion.

The first FPCB may further include a terminal connection portion that extends from the bending portion and receives the electrical signal from an to external terminal.

The bending portion may include at least two branch portions.

The bending portion may be configured to be bent or unbent in response to a movement of the first moving frame in the optical axis direction.

A modification range of the bending portion may be approximately 0.2 mm or less in the optical axis direction.

A modification angle of the bending portion may be approximately 2° or less in the optical axis direction based on the bonding portion.

The second moving frame may be configured to move in directions perpendicular to the optical axis direction by an interaction between a magnet and a coil. The first moving frame may include one from the magnet and the coil, and the second moving frame may include the other one from the magnet and the coil.

The first moving frame may include a fine pattern coil, and the second moving frame may include a magnet.

The second moving frame may be configured to move two-dimensionally in the directions perpendicular to the optical axis direction.

The first moving frame may include a plurality of first hole sensors that sense movement of the second moving frame in the directions perpendicular to the optical axis direction.

The first FPCB may be embedded with at least twelve wiring electrodes.

The small camera apparatus may further include a second FPCB that provides an electrical signal, for driving the first moving frame, to the supporting frame.

The first moving frame may be configured to move in the optical axis direction by an interaction between a magnet and a coil. The first moving frame may include one from the magnet and the coil, and the supporting frame may include the other one from the magnet and the coil.

The supporting frame may include a second hole sensor that senses movement of the first moving frame.

The second FPCB may be embedded with at least six wiring electrodes.

The bending portion may include a bending indication portion for a virtual bending line.

A size of a plane of the small camera apparatus, which is perpendicular to the optical axis direction, may be approximately 225 mm$^2$ or less.

Another embodiment includes a flexible printed circuit board (FPCB) that provides an electrical signal for movement in directions perpendicular to an optical axis direction. The FPCB provides the electrical signal to a lens driving assembly which is loaded with a lens barrel and configured to move the lens barrel in the optical axis direction and directions perpendicular to the optical axis direction to perform an autofocus function and an optical image stabilization (OIS) function, respectively. At least a portion of the FPCB is bent and is disposed between a base, in which an image sensor is provided, and the lens driving assembly. At least a portion of the bent portion is bonded to reduce a bending tension that occurs in a direction opposite to a bending direction when the FPCB is bent.

The FPCB may include a fixing portion that is fixedly connected to the lens driving assembly, a bending portion that extends from the fixing portion and of which at least a portion is bent and is disposed between the base and the lens driving assembly, and a bonding portion that bonds a connection area of the bending portion.

The FPCB may further include a terminal connection portion that extends from the bending portion and receives the electrical signal from an external terminal.

The bending portion may include at least two branch portions.

The bending portion may be configured to be bent or unbent in response to a movement of the lens driving assembly in the optical axis direction.

A modification range of the bending portion may be approximately 0.2 mm or less in the optical axis direction.

A modification angle of the bending portion may be approximately 2° or less in the optical axis direction based on the bonding portion.

The FPCB may include a plurality of hole sensors that sense movement of the lens driving assembly in the direction perpendicular to the optical axis direction.

The FPCB may be embedded with at least twelve wiring electrodes.

An FPCB according to an embodiment and a small camera apparatus including the FPCB may reduce or minimize a bending tension occurring due to a bending of the FPCB while following the movement of a lens barrel by improving the structure of the FPCB.

BRIEF DESCRIPTION OF THE DRAWINGS

The above and other features and advantages of the embodiments will become more apparent by describing in detail exemplary embodiments thereof with reference to the attached drawings in which.

DETAILED DESCRIPTION

Hereinafter, the structures and operations of flexible printed circuit boards (FPCBs) and small camera apparatuses including the FPCBs according to embodiments of the invention are described in detail.

Figure 1:
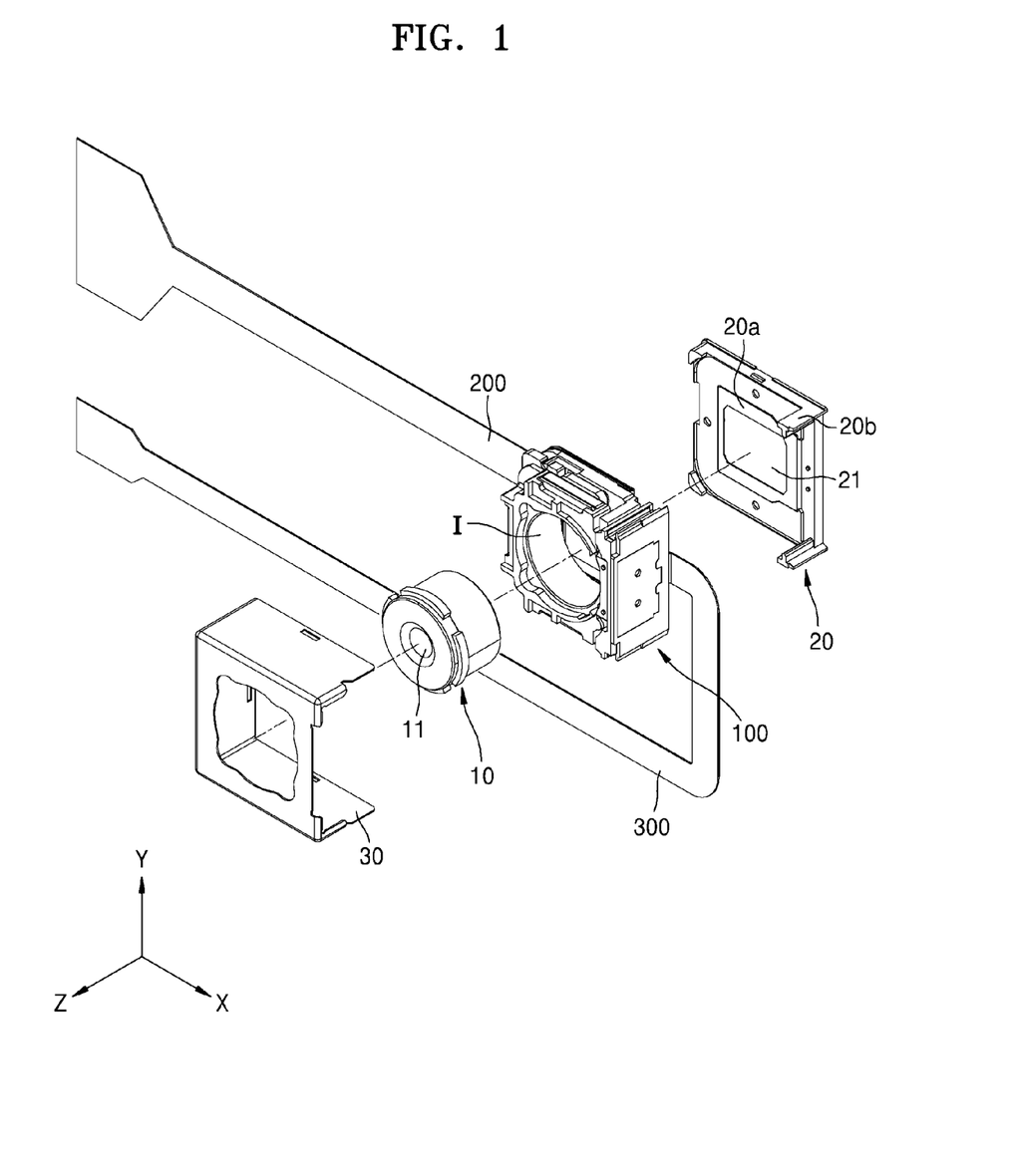
FIG. 1 is an exploded perspective view of a small camera apparatus according to an embodiment.
Figure 2:
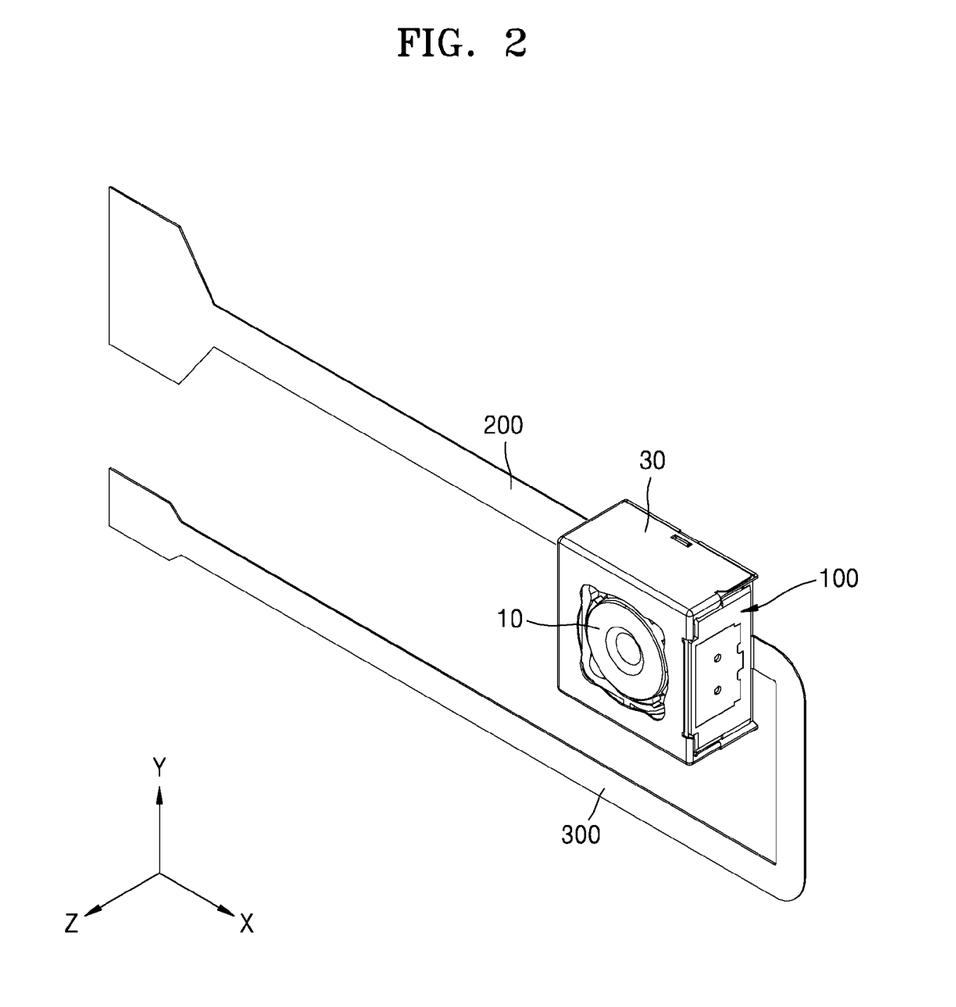
FIG. 2 is an assembly perspective view of the small camera apparatus of FIG. 1.

FIG. 1 is an exploded perspective view of a small camera apparatus according to an embodiment, and FIG. 2 is an assembled perspective view of the small camera apparatus of FIG. 1.

Referring to FIGS. 1 and 2, the small camera apparatus may include a lens barrel 10 including at least one lens 11, a lens driving assembly 100 that is loaded with the lens barrel 10 and drives the lens barrel 10 in an optical axis (e.g., the Z-axis) direction and directions (e.g., the X-axis direction, the Y-axis direction, or both) perpendicular to the optical axis direction, a base 20 that is disposed at a lower part of the lens driving assembly 100 and is mounted with an image sensor 21, an upper case 30 that is disposed at an upper part of the lens driving assembly 100 and protects the lens driving assembly 100, and first and second FPCBs 200 and 300 that provide electrical signals for driving the lens driving assembly 100.

The lens barrel 10 is disposed spaced apart from the image sensor 21 mounted in the base 20 in the optical axis direction, and focuses light from outside the small camera apparatus toward the image sensor 21.

The lens driving assembly 100 is loaded with the lens barrel 10, and may move the lens barrel 10 in the optical axis direction and thus may perform an autofocus function for automatically adjusting a focus of an image that is formed on the image sensor 21. In addition, the lens driving assembly 100 may move the lens barrel 10 in the directions perpendicular to the optical axis direction and thus may perform an optical image stabilization (OIS) function of preventing image degradation due to a vibration such as a hand tremor.

The first FPCB 200 may provide an electrical signal that is used for performing the OIS function of the lens driving assembly 100, and the second FPCB 300 may provide an electrical signal that is used for performing the autofocus function of the lens driving assembly 100. The first FPCB 200 provides an electrical signal for a two dimensional (2D) movement in the directions perpendicular to the optical axis direction to perform the OIS function, and the second FPCB 300 provides an electrical signal for a one dimensional (1D) movement in the optical axis direction to perform the autofocus function.

The base 20 is disposed at the lower part of the lens driving assembly 100, and the image sensor 21 may be mounted on a central portion of the upper side of the base 20. At least a portion 20a of the base 20 may be a printed circuit board or a ceramic board. The lens driving assembly 100 may be supported on a portion 20b of the base 20.

To move the lens barrel 10, the lens driving assembly 100 may be configured to use a voice coil motor (VCM) method using an electromagnetic force generated between a coil and a magnet, an ultrasonic motor method using a piezoelectric element, or a method of driving the lens barrel 10 by applying a current to a shape memory alloy. Below, an example in which the lens driving assembly 100 uses the VCM method is described.

Figure 3:
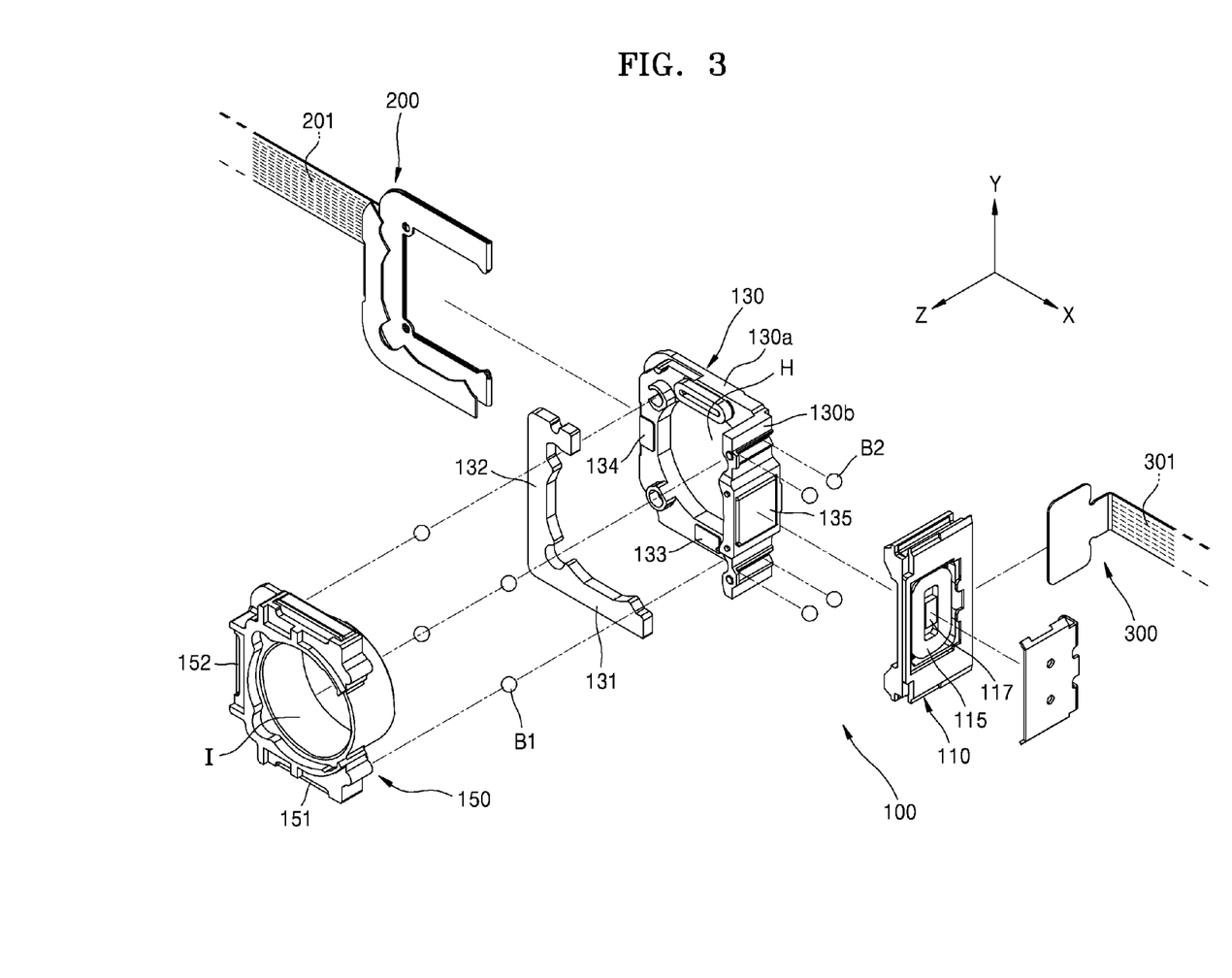
FIG. 3 is an exploded perspective view illustrating a lens driving assembly and first and second flexible printed circuit boards of the small camera apparatus illustrated in FIG. 1.

FIG. 3 is an exploded perspective view illustrating the lens driving assembly 100 and the first and second FPCB 200 and 300 of the small camera apparatus illustrated in FIG. 1.

Referring to FIG. 3, the lens driving assembly 100 may include a supporting frame 110, a first moving frame 130 supported on the supporting frame 110 to be movable in the optical axis direction, and a second moving frame 150 supported on the first moving frame 130 to be movable in the directions perpendicular to the optical axis direction.

The second moving frame 150 may include a loading part I in which the lens barrel 10 may be loaded, and a plurality of first magnets 151 and 152 located around the loading part I. At least one first magnet 151 of the plurality of first magnets 151 and 152 may be disposed in a first axis (for example, the X-axis) direction, and at least one first magnet 152 of the plurality of first magnets 151 and 152 may be disposed in a second axis (for example, the Y-axis) direction perpendicular to the first axis.

In the first moving frame 130, a hole H through which light may pass may be formed in a position corresponding to the loading part I, and a plurality of first coils 131 and 132 may be formed in positions corresponding to the plurality of first magnets 151 and 152. Although as shown in FIG. 3, the plurality of first coils 131 and 132 are formed as a single member, in alternative embodiments, the plurality of first coils 131 and 132 may be formed as separate members. Light received through the lens barrel 10 passes through the hole H of the first moving frame 130 and then reaches the image sensor 21. The second moving frame 150 two-dimensionally moves in the directions perpendicular to the optical axis direction with respect to the first moving frame 130 by an electromagnetic force generated between the plurality of first magnets 151 and 152 and the plurality of first coils 131 and 132. The second moving frame 150 performs the OIS function by two-dimensionally moving in the directions perpendicular to the optical axis direction. The first FPCB 200 transmits an electrical signal for driving the second moving frame 150 to the plurality of first coils 131 and 132 to move the second moving frame 150. The first moving frame 130 may include a plurality of first hole sensors, for example, two first hole sensors 133 and 134, for sensing a two-dimensional (2D) driving of the second moving frame 150. The first hole sensors 133 and 134 may sense the driving of the second moving frame 150 mounted with the first magnets 151 and 152 by outputting an electrical signal in proportion to magnetic fields of the first magnets 151 and 152 by using a Hall effect. An accurate OIS of the small camera apparatus may be performed based on the first hole sensors 133 and 134.

A fine pattern coil may be used as the first coils 131 and 132. In this case, thicknesses of the first coils 131 and 132 in the optical axis direction may be reduced compared to rolled coils.

In order for the second moving frame 150 to be supported on the first moving frame 130 and to be movable in the directions perpendicular to the optical axis direction, at least one first ball bearing B1 may be disposed between the first moving frame 130 and the second moving frame 150.

The first FPCB 200 transmits an electrical signal, for driving the second moving frame 150, to the first moving frame 130. The first FPCB 200 electrically contacts the first coils 131 and 132 and the first hole sensors 133 and 134 and transmits electrical signals to the first coils 131 and 132 and the first hole sensors 133 and 134.

The first FPCB 200 may be embedded with twelve wiring electrodes 201 to provide electrical signals to provide the first coils 131 and 132 and the first hole sensors 133 and 134 of the first moving frame 130. Since generally, two wiring electrodes are needed for each coil and four wiring electrodes are needed for each hole sensor, twelve wiring electrodes 201 are needed to provide electrical signals to the two first coils 131 and 132 and the two first hole sensors 133 and 134. However, alternate wiring electrode configurations will be apparent to those skilled in the art. The wiring electrodes 201 may be connected to pins 271 of a terminal connection portion 270 illustrated in FIG. 5.

A cross section of the first moving frame 130 may have an "L" shape. The first moving frame 130 may include a first portion 130a of the L shape and a second portion 130b of the L shape, perpendicular to the first portion 130a. The first coils 131 and 132 and the first hole sensors 133 and 134 may be disposed in the first portion 130a, and a second magnet 135 may be disposed in the second portion 130b. As shown in FIG. 3, the second magnet 135 may be disposed spaced apart from the first magnets 151 and 152 to reduce interference with the first magnets 151 and 152.

The supporting frame 110 supports the first moving frame 130 to be movable in the optical axis direction, and may be supported by the base 20. In the supporting frame 110, a second coil 115 and a second hole sensor 117 may be disposed in a position corresponding to the second magnet 135. The first moving frame 130 may perform the autofocus function by moving in the optical axis direction through an electromagnetic force generated between the second coil 115 and the second magnet 135. A movement of the first moving frame 130 in the optical axis direction may be sensed by the second hole sensor 117, and thus, an accurate autofocus may be performed. The second hole sensor 117 may be disposed in the central portion of the second coil 115.

The second FPCB 300 transmits an electrical signal, for driving the first moving frame 130, to the supporting frame 110. The second FPCB 300 electrically contacts the second coil 115 and the second hole sensor 117 and transmits electrical signals to the second coil 115 and the second hole sensor 117. The second FPCB 300 may be embedded with at least six wiring electrodes 301 to provide electrical signals to the second coil 115 and the second hole sensor 117 of the first moving frame 130. However, alternate wiring electrode configurations will be apparent to those skilled in the art.

In order for the first moving frame 130 to be supported on the supporting frame 110 to be movable in the optical axis direction, at least one second ball bearing B2 may be disposed between the supporting frame 110 and the first moving frame 130.

Figure 4:
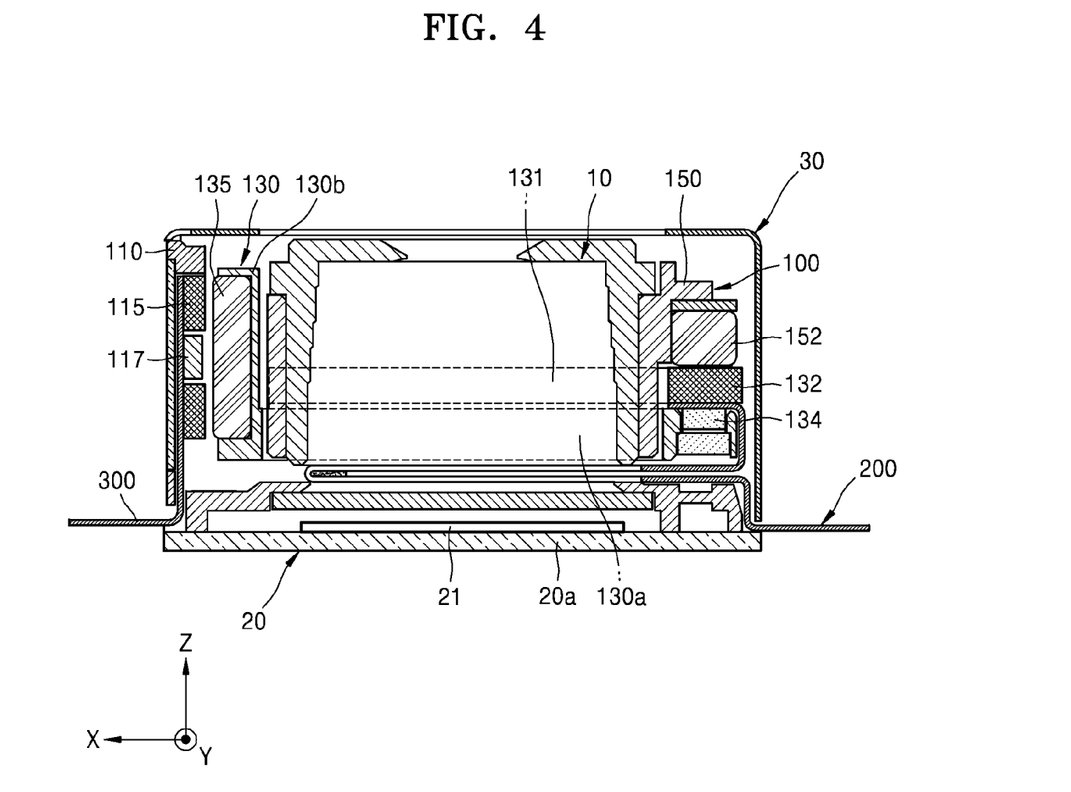
FIG. 4 is a cross-sectional view of the small camera apparatus of FIG. 2.

FIG. 4 is a cross-sectional view of the small camera apparatus of FIG. 2. Referring to FIG. 4, the small camera apparatus includes the base 20 mounted with the image sensor 21, the lens driving assembly 100 that is mounted at the upper portion of the base 20 and moves the lens barrel 10 in the optical axis direction and the directions perpendicular to the optical axis direction, the upper case 30 that covers an upper portion of the lens driving assembly 100, and the first and second FPCBs 200 and 300 that provide electrical signals to the lens driving assembly 100.

The first FPCB 200 electrically contacts the first coil 132 and the first hole sensor 134, which are disposed in the first moving frame 130 which is driven in the optical axis direction. To this end, a portion of the first FPCB 200 may be fixed to the first moving frame 130, and thus, the portion of the first FPCB 200 is driven together with the first moving frame 130 based on the driving of the first moving frame 130. In this case, since the first moving frame 130 moves in the optical axis direction, the portion of the first FPCB 200 fixed to the first moving frame 130 moves together with the first moving frame 130 in the optical axis direction. At least a portion of the first FPCB 200 may be bent to transmit stable electrical signals to the first coil 132 and the first hole sensor 134, which move in the optical axis direction.

Since a plane size of the small camera apparatus in the directions perpendicular to the optical axis direction may be very small, for example, approximately 225 mm² or less, or 11 mm×11 mm, it is desirable to consider a bending tension of the first FPCB 200, for example, a bending tension that occurs in a direction opposite to a bending direction of the first FPCB 200 when the first FPCB 200 is bent (e.g., when moved with the first moving frame 130). The bending tension is a force by which an FPCB, once bent in a bending direction, attempts to return to an unbent position, the force being in a direction opposite to the bending direction of the FPCB (e.g., a force due to elastic deformation of the FPCB). When the bending tension is larger than a force to drive the first moving frame 130, the first moving frame 130 may not be driven as desired based on a driving signal and thus it may be difficult to accurately drive the lens barrel 10.

In the embodiment shown, since the second FPCB 300 contacts the second coil 115 and the second hole sensor 117, which are disposed in the supporting frame 110 and thus in a fixed position, the second FPCB 300 does not need to be bent and thus it is not necessary to consider a bending tension with respect to the second FPCB 300.

Figure 5:
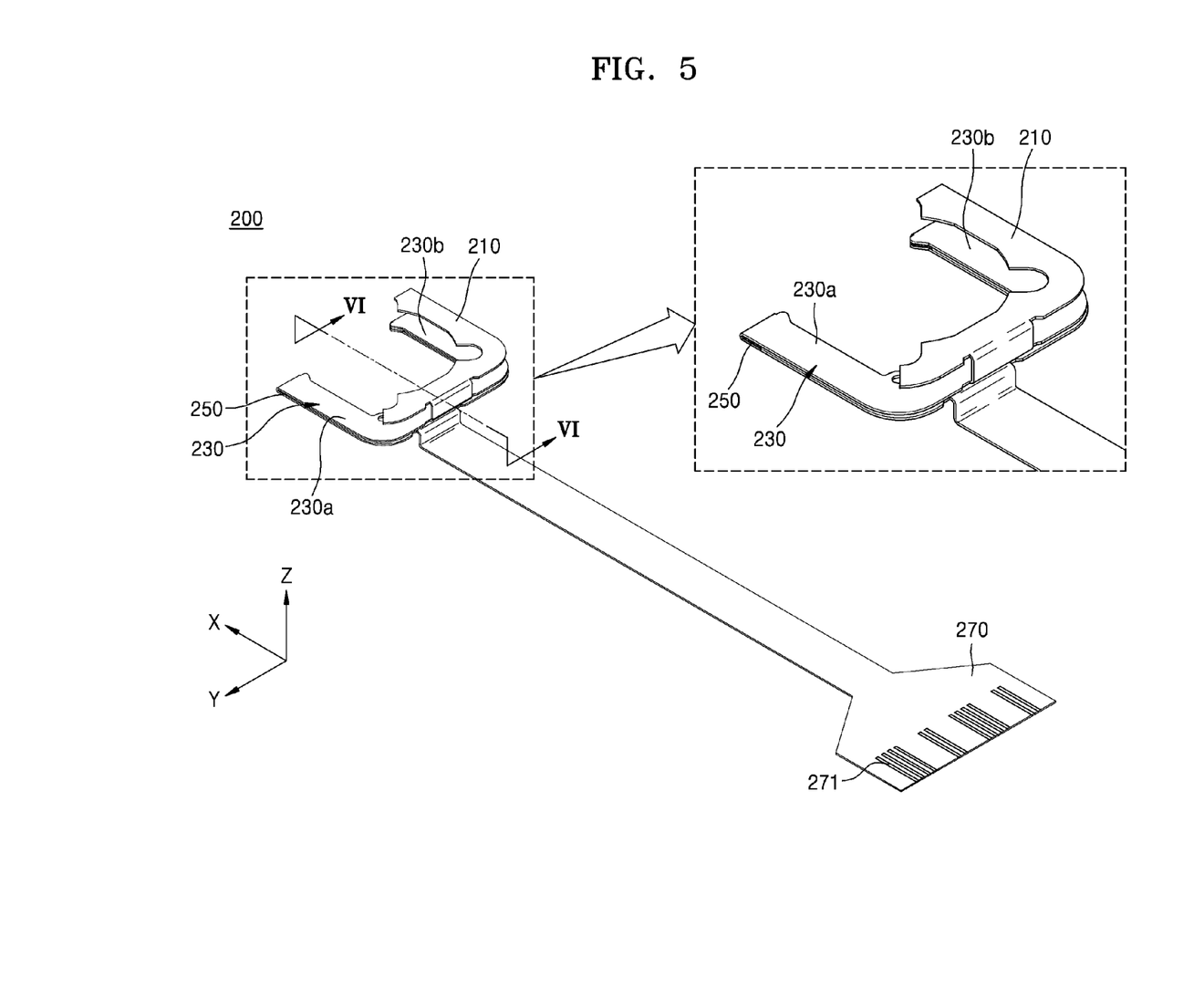
FIG. 5 is a perspective view illustrating a first flexible printed circuit board of FIG. 4, in which a portion of the first flexible printed circuit board is magnified.
Figure 6:
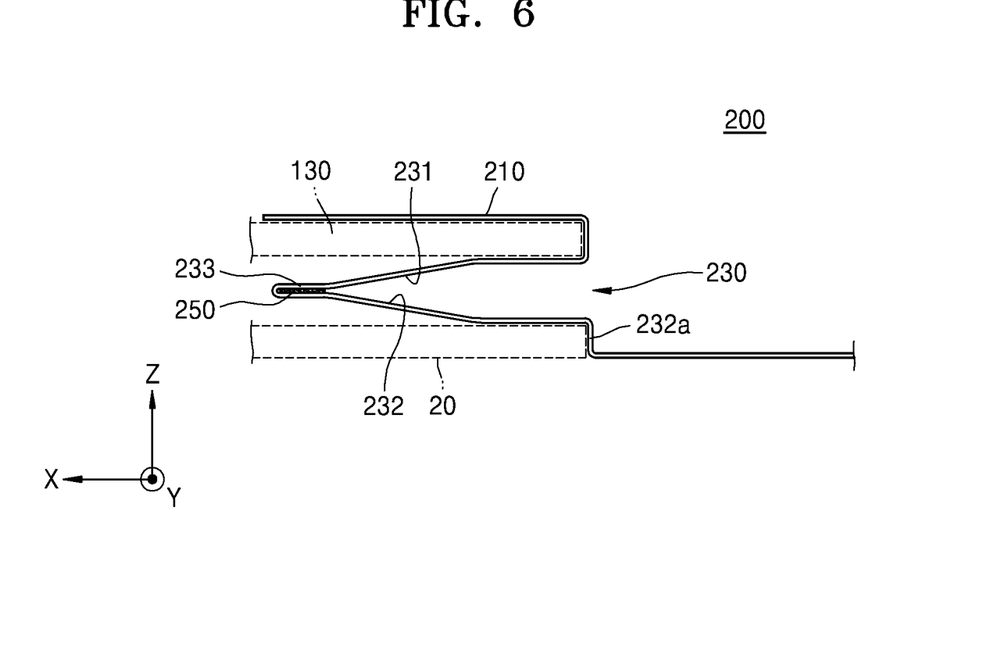
FIG. 6 is a cross-sectional view taken along the line VI-VI illustrated in FIG. 5.

FIG. 5 is a perspective view illustrating the first FPCB 200 of FIG. 4, in which a portion of the first FPCB 200 is magnified. FIG. 6 is a cross-sectional view taken along the line VI-VI illustrated in FIG. 5.

Referring to FIG. 5, the first FPCB 200 may include a fixing portion 210 that is fixedly connected to the first moving frame 130, a bending portion 230 that extends from the fixing portion 210 and of which at least a portion is bent and is disposed between the base 20 and the first moving frame 130, a bonding portion 250 that bonds portions of the bending portion 230, and a terminal connection portion 270 that extends from the bending portion 230 and receives an electrical signal from an external terminal (not shown).

In the embodiment shown, the fixing portion 210 contacts the first coils 131 and 132 and the first hole sensors 133 and 134 of the first moving frame 130. When a fine pattern coil is used as the first coils 131 and 132, a shape of the fixing portion 210 may be formed to have a shape corresponding to shapes of the first coils 131 and 132. Referring to FIG. 4, a lower portion of the fixing portion 210 is fixed to the upper side of the first moving frame 130 and electrically contacts the first hole sensors 133 and 134, and an upper portion of the fixing portion 210 electrically contacts the first coils 131 and 132.

Referring to the embodiment of FIG. 6, at least a portion of the bending portion 230 is bent to be disposed between the base 20 and the first moving frame 130, and moves along with the movement of the first moving frame 130 in the optical axis direction.

The bending portion 230 includes a first area 231 that is connected to the fixing portion 210 and is disposed to be inclined with respect to the optical axis direction (e.g., the Z-axis), a second area 232 that is disposed to be opposite to the inclination direction of the first area 231 and is connected to the terminal connection portion 270, and a connection area 233 that connects the first area 231 to the second area 232.

The connection area 233 may be bonded by the bonding portion 250. By bonding the connection area 233 by using the bonding portion 250, a bending tension may be reduced or minimized in the first FPCB 200. For example, a force by which the first FPCB 200, once bent in a bending direction, attempts to return to an unbent position, may be minimized.

A portion 232a of the second area 232 may be fixed to the base 20. The fixed portion 232a may reduce or minimize an effect of bending of the terminal connection portion 270 on the first area 231, the connection area 233, and the second area 232 of the first FPCB 200. The fixed portion 232a may also reduce or minimize an effect of bending of the first area 231, the connection area 233, and the second area 232 on the terminal connection portion 270.

Referring back to FIG. 5, the bending portion 230 may branch off into at least two branch portions. For example, the bending portion 230 may comprise a first branch portion 230a and a second branch portion 230b. The first branch portion 230a and the second branch portion 230b may be spaced apart from each other so that light may pass therebetween. The bending tension of the bending portion 230 is based on a width of the bending portion 230. A bending portion 230 that is wider corresponds to an increase in bending tension. However, the bending tension may be reduced by reducing the width of the bending portion 230.

Figure 7:
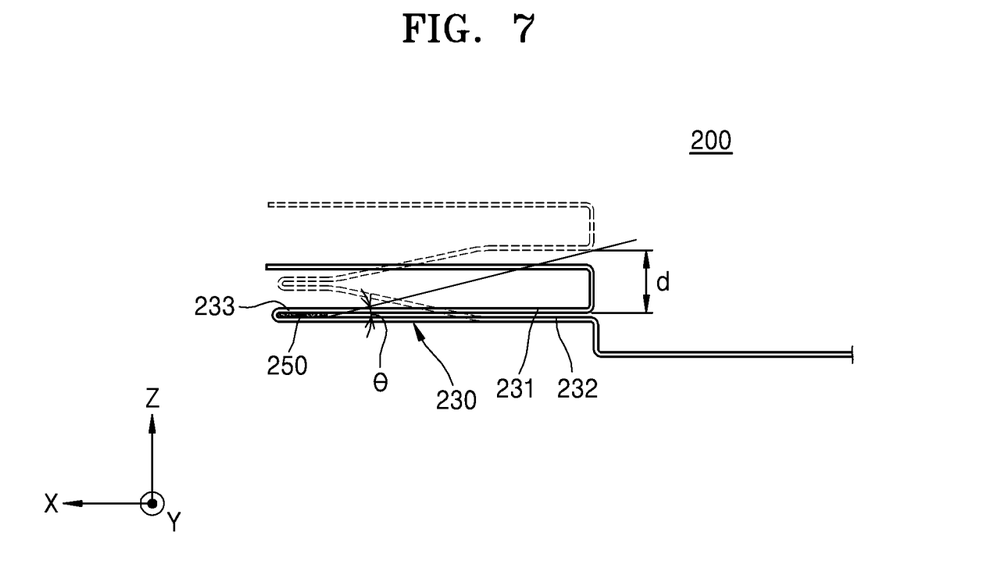
FIG. 7 is a schematic diagram illustrating an operation state of the first flexible printed circuit board of FIG. 6.

FIG. 7 is a schematic diagram illustrating an operation state of the first FPCB 200 of FIG. 6. As the first moving frame 130 moves in the optical axis direction (e.g., into or out of the Z-axis), the bending portion 230 of the first FPCB 200 may be bent or unbent as shown in FIG. 7, in response to the movement of the first moving frame 130.

The bending portion 230 is configured to be bent or unbent in the optical axis direction as shown in FIG. 7, and thus, a shape of the bending portion 230 is modified.

The shape of the bending portion 230 may be modified within a range in which the bonding portion 250, formed in the connection area 233, maintains the to bonding in the connection area 233. When the bonding of the bonding portion 250 is reduced or relieved (e.g., by bending outside of the range which maintains the bonding in the connection area 233), the bending tension of the bending portion 230 increases and thus the driving of the lens barrel 10 may be inaccurate or may be stopped. In an embodiment, the small camera apparatus may be configured such that a modification angle θ and a modification range d of the bending portion 230 may be minimized. For example, the modification range d of the bending portion 230 may be approximately 0.2 mm or less in the optical axis direction. In a further example, the modification angle θ of the bending portion 230 may be approximately 2° or less based on the bonding portion.

Figure 8:
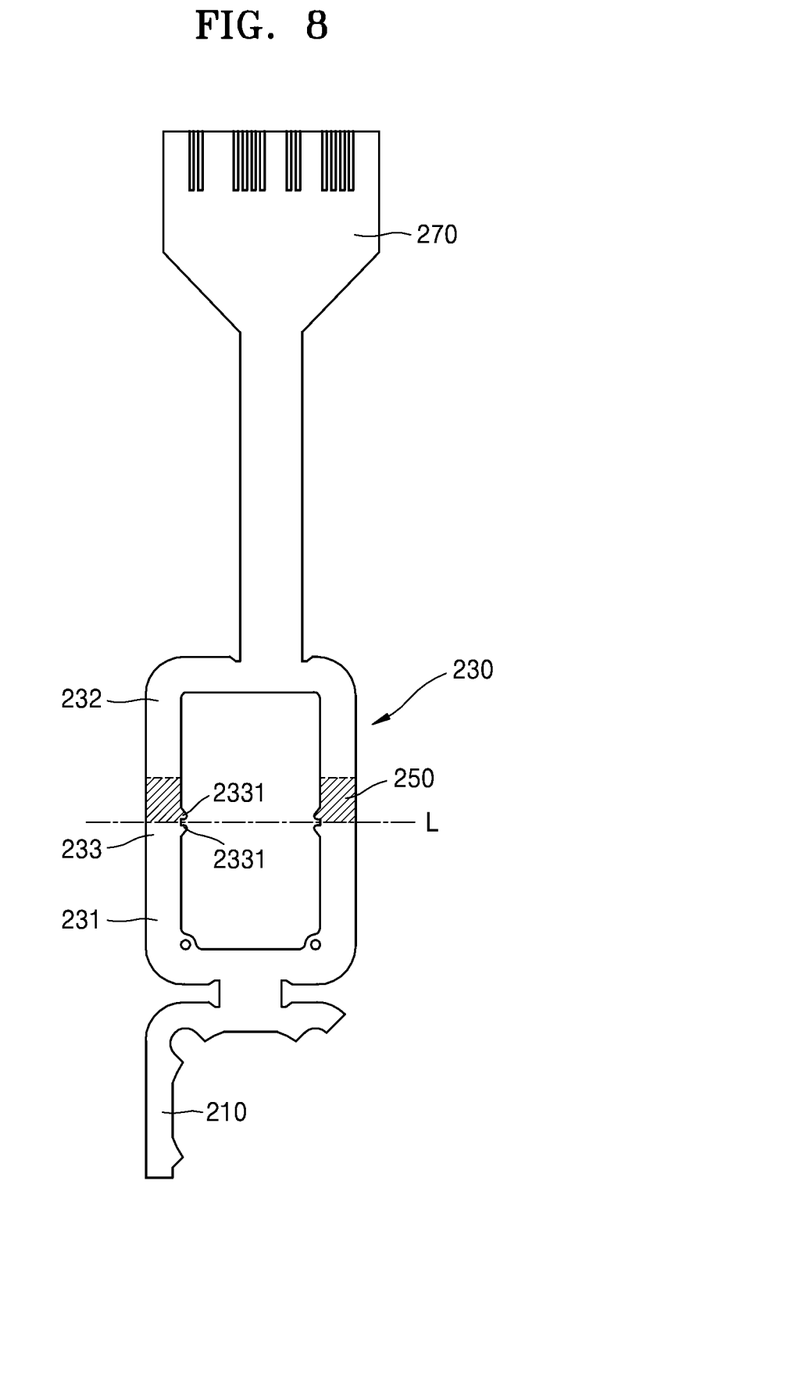
FIG. 8 is a planar view of the first flexible printed circuit board of FIG. 5.

FIG. 8 is a planar view of the first FPCB 200 of FIG. 5. The first FPCB 200 may have a shape as shown in FIG. 8 before being bent to have a final shape as shown in FIG. 5. The bending portion 230 may have a virtual bending line L, and a bonding member (not shown) may be disposed around the virtual bending line L. Then, by bending the bending portion 230 based on the virtual bending line L, the connection area 233 disposed between the first area 231 and the second area 232 is bonded to the bonding member, and thus, the bonding portion 250 is formed.

In this case, to promote an accurate bending of the bending portion 230, the bending portion 230 may include at least one bending indication portion 2331 to provide the virtual bending line L. The bending indication portion 2331 may protrude in an extending direction of the virtual bending line L as shown in FIG. 8. In alternative embodiments, the bending indication portion 2331 may have a concave shape. Through the bending indication portion 2331, the bending portion 230 may be accurately and simply bent while the first FPCB 200 is manufactured.

Reference numerals are shown in the drawings for understanding the embodiments, and certain terms are used to describe the embodiments. However, the invention will be not limited to the certain terms and may include all elements generally thought by those skilled in the art.

All references, including publications, patent applications, and patents, cited herein are hereby incorporated by reference to the same extent as if each reference were individually and specifically indicated to be incorporated by reference and were set forth in its entirety herein.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Certain executions described in the description are just embodiments and do not limit the scope of the invention in any way. For simplicity of description, there will be omitted description for general electronic elements, control systems, software, and other functional aspects of the systems. Also, connections of lines between elements shown in the drawings or connecting members are just for exemplarily showing functional connections and/or physical or circuital connections. In real apparatuses, there may be embodied as replaceable, additional various functional connections, physical connections, or circuital connections. Also, when there is no detailed mention such as "essential" or "importantly", it is not an essential element for applying the invention. Expressions used herein such as "Comprising" or "including" are used to be understood as terms for open ending of technology.

In the specification, particularly, in claims, the term "the" and designation terms similar thereto may correspond to both a singular form and a plural form. Also, when there is disclosed a range, the invention to which separate values belonging to the range are applied are included if there is no contrary description, which is identical to setting forth separate values forming the range, respectively. When there is not clearly described sequence of operations forming a method according to an embodiment of the present invention or there is no description contrary thereto, the operations may be performed in a proper sequence.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A small camera apparatus comprising:
a base having an image sensor;
a lens barrel disposed to be spaced apart from the image sensor in an optical axis direction, the lens barrel having at least one lens;
a lens driving assembly having a supporting frame, a first moving frame supported on the supporting frame to be movable in the optical axis direction, and a second moving frame loaded with the lens barrel and supported on the first moving frame to be movable in directions perpendicular to the optical axis direction; and
a first flexible printed circuit board (FPCB) that provides an electrical signal, for driving the second moving frame, to the first moving frame,
wherein a continuous portion of the first FPCB which is disposed between the base and the first moving frame includes a bending portion where the FPCB is bent over itself to form a connection area where inner surfaces of the FPCB in the connection area are bonded together.

2. The small camera apparatus of claim 1, wherein the first FPCB comprises:
a fixing portion that is fixedly connected to the first moving frame;
a bending portion that extends from the fixing portion and of which at least a portion is bent and is disposed between the base and the first moving frame; and
a bonding portion that bonds a connection area of the bending portion.

3. The small camera apparatus of claim 2, wherein the first FPCB further comprises a terminal connection portion that extends from the bending portion and receives the electrical signal from an external terminal.

4. The small camera apparatus of claim 2, wherein the bending portion comprises at least two branch portions.

5. The small camera apparatus of claim 2, wherein the bending portion is configured to be bent or unbent in response to a movement of the first moving frame in the optical axis direction.

6. The small camera apparatus of claim 5, wherein a modification range of the bending portion is approximately 0.2 mm or less in the optical axis direction.

7. The small camera apparatus of claim 5, wherein a modification angle of the bending portion is approximately 2° or less in the optical axis direction based on the bonding portion.

8. The small camera apparatus of claim 1, wherein the second moving frame is configured to move in directions perpendicular to the optical axis direction by an interaction between a magnet and a coil.

9. The small camera apparatus of claim 8, wherein the first moving frame comprises one from the magnet and the coil, and the second moving frame comprises the other one from the magnet and the coil.

10. The small camera apparatus of claim 9, wherein the first moving frame comprises a fine pattern coil, and the second moving frame comprises a magnet.

11. The small camera apparatus of claim 1, wherein the second moving frame is configured to move two-dimensionally in the directions perpendicular to the optical axis direction.

12. The small camera apparatus of claim 11, wherein the first moving frame comprises a plurality of first hole sensors that sense movement of the second moving frame in the directions perpendicular to the optical axis direction.

13. The small camera apparatus of claim 12, wherein the first FPCB is embedded with at least twelve wiring electrodes.

14. The small camera apparatus of claim 1, further comprising a second FPCB that provides an electrical signal, for driving the first moving frame, to the supporting frame.

15. The small camera apparatus of claim 14, wherein the first moving frame is configured to move in the optical axis direction by an interaction between a magnet and a coil.

16. The small camera apparatus of claim 15, wherein the first moving frame comprises one from the magnet and the coil, and the supporting frame comprises the other one from the magnet and the coil.

17. The small camera apparatus of claim 14, wherein the supporting frame comprises a second hole sensor that senses movement of the first moving frame.

18. The small camera apparatus of claim 17, wherein the second FPCB is embedded with at least six wiring electrodes.

19. The small camera apparatus of claim 2, wherein the bending portion comprises a bending indication portion for a virtual bending line.

20. The small camera apparatus of claim 1, wherein a size of a plane of the small camera apparatus, which is perpendicular to the optical axis direction, is approximately 225 $mm^2$ or less.

21. An apparatus, comprising:
a flexible printed circuit board (FPCB) that provides an electrical signal for movement, in directions perpendicular to an optical axis direction, to a lens driving assembly which is loaded with a lens barrel and is configured to move the lens barrel in the optical axis direction and the directions perpendicular to the optical axis direction to perform an autofocus function and an optical image stabilization (OIS) function, respectively,
wherein a continuous portion of the FPCB which is disposed between a base, in which an image sensor is provided, and the lens driving assembly, includes a bending portion where the FPCB is bent over itself to form a connection area where inner surfaces of the FPCB in the connection area are bonded together.

22. The apparatus of claim 21, wherein the FPCB comprises
a fixing portion that is fixedly connected to the lens driving assembly;
a bending portion that extends from the fixing portion and of which at least a portion is bent and is disposed between the base and the lens driving assembly; and
a bonding portion that bonds a connection area of the bending portion.

23. The apparatus of claim 22, wherein the FPCB further comprises a terminal connection portion that extends from the bending portion and receives the electrical signal from an external terminal.

24. The apparatus of claim 22, wherein the bending portion comprises at least two branch portions.

25. The apparatus of claim 22, wherein the bending portion is configured to be bent or unbent in response to a movement of the lens driving assembly in the optical axis direction.

26. The apparatus of claim 25, wherein a modification range of the bending portion is approximately 0.2 mm or less in the optical axis direction.

27. The apparatus of claim 25, wherein a modification angle of the bending portion is approximately 2° or less in the optical axis direction based on the bonding portion.

28. The apparatus of claim 21, wherein the FPCB further comprises a plurality of hole sensors that sense movement of the lens driving assembly in the directions perpendicular to the optical axis direction.

29. The apparatus of claim 28, wherein the FPCB is embedded with at least twelve wiring electrodes.

* * * * *